US010400718B2

(12) United States Patent
Burckel et al.

(10) Patent No.: US 10,400,718 B2
(45) Date of Patent: Sep. 3, 2019

(54) INTAKE DISTRIBUTOR WITH AN INTEGRATED HEAT EXCHANGER (71) Applicant: SOGEFI AIR & COOLING, Guyancourt (FR)

(72) Inventors: Francois Burckel, Villers-le-Lac (FR); Nicolas Becker, Holtzwihr (FR); Benoit Ancel, Eguisheim (FR); Michel Andres, Mulhouse (FR)

(73) Assignee: SOGEFI AIR & COOLING, Guyancourt (FR)

( * ) Notice: Subject to any disclaimer, the term of this patent is extended or adjusted under 35 U.S.C. 154(b) by 12 days.

(21) Appl. No.: 15/835,017

(22) Filed: Dec. 7, 2017

(65) Prior Publication Data

US 2018/0156170 A1 Jun. 7, 2018

(30) Foreign Application Priority Data

Dec. 7, 2016 (FR) ...................... 16 62046

(51) Int. Cl.
*F02B 29/04* (2006.01)
*F02M 35/10* (2006.01)
*F02M 35/104* (2006.01)
*F28F 9/00* (2006.01)
*F16J 15/02* (2006.01)
*F16J 15/06* (2006.01)
*F28F 9/007* (2006.01)
*F28D 21/00* (2006.01)

(52) U.S. Cl.
CPC ... *F02M 35/10268* (2013.01); *F02B 29/0475* (2013.01); *F02M 35/104* (2013.01);
(Continued)

(58) Field of Classification Search
CPC ............... Y02T 10/146; F02B 29/0462; F28D 2021/0082; F28D 21/0003;
(Continued)

(56) References Cited

U.S. PATENT DOCUMENTS

2002/0144801 A1* 10/2002 Gokan ................ F02B 29/0462
165/51
2011/0088663 A1 4/2011 Dehnen et al.
(Continued)

FOREIGN PATENT DOCUMENTS

DE 10 2007 030 464 A1 1/2009
DE 10 2008 061 759 A1 6/2010
(Continued)

OTHER PUBLICATIONS

French Search Report, dated Jun. 2, 2017, from corresponding FR application No. 1662046.

*Primary Examiner* — Hai H Huynh
*Assistant Examiner* — Gonzalo Laguarda
(74) *Attorney, Agent, or Firm* — Young & Thompson (57) ABSTRACT Disclosed is an intake distributor for an internal combustion engine that includes an integrated heat exchanger. This exchanger includes a support plate that ensures its rigid mounting in the distributor and peripheral seal that form an essentially continuous circumferential airtight barrier between the exchanger and the distributor, peripherally dividing the interstitial volume into two. The subdivision plane of the interstitial volume is perpendicular in relation to the plane of the support plate, and the peripheral seal consist of two complementary components that are connected to one another and made integral with the exchanger.

20 Claims, 12 Drawing Sheets (52) U.S. Cl.
CPC .. *F02M 35/1034* (2013.01); *F02M 35/10288* (2013.01); *F16J 15/022* (2013.01); *F16J 15/025* (2013.01); *F16J 15/062* (2013.01); *F28F 9/001* (2013.01); *F28F 9/005* (2013.01); *F28F 9/007* (2013.01); *F02B 29/0462* (2013.01); *F02M 35/10321* (2013.01); *F28D 2021/0026* (2013.01); *F28D 2021/0082* (2013.01); *F28F 2225/02* (2013.01); *F28F 2230/00* (2013.01); *Y02T 10/146* (2013.01)

(58) Field of Classification Search
CPC ....... F02M 35/10268; F02M 2700/434; F02M 2700/4342; F02M 2700/4359
USPC ..... 123/539, 542, 556; 165/47, 48.1, 51, 72, 165/73, 74, 75
See application file for complete search history.

(56) References Cited

U.S. PATENT DOCUMENTS

| | | |
|---|---|---|
| 2012/0247437 A1 | 10/2012 | Leroux |
| 2014/0109858 A1 | 4/2014 | Ancel et al. |
| 2014/0138071 A1 | 5/2014 | Odillard et al. |
| 2014/0311143 A1* | 10/2014 | Speidel ................. F02B 37/00 60/599 |
| 2017/0023315 A1 | 1/2017 | Devedeux et al. |

FOREIGN PATENT DOCUMENTS

| | | |
|---|---|---|
| DE | 10 2009 049 455 A1 | 4/2011 |
| DE | 10 2013 006 956 A1 | 10/2014 |
| EP | 0 578 916 A2 | 1/1994 |
| EP | 2 706 209 A1 | 3/2014 |
| EP | 2 715 267 A1 | 4/2014 |
| EP | 2 722 516 A1 | 4/2014 |
| FR | 2 645 209 A1 | 10/1990 |
| FR | 2 908 833 A1 | 5/2008 |
| FR | 2 936 572 A1 | 4/2010 |
| GB | 1 540 465 A | 2/1979 |
| WO | 2008/061850 A1 | 5/2008 |
| WO | 2009/027492 A1 | 3/2009 |
| WO | 2011/061311 A1 | 5/2011 |
| WO | 2011/064087 A1 | 6/2011 |
| WO | 2012/159730 A1 | 11/2012 |
| WO | 2015/149951 A1 | 10/2015 |

* cited by examiner

INTAKE DISTRIBUTOR WITH AN INTEGRATED HEAT EXCHANGER

BACKGROUND OF THE INVENTION

Field of the Invention

This invention relates to the field of technical equipment for motor vehicles with internal combustion engines, more particularly the elements and components that form the fuel-gas intake line of these engines.

In this context, the invention has as its object a distributor or intake collector integrating a heat exchanger.

A large number of embodiments of distribution or intake collectors are known in the state of the art. The same holds true for heat exchangers, in particular those designed to cool the supercharged air or else those designed to cool the EGR (exhaust gas recirculation) gases before they are mixed with fresh air, for the purpose of injecting the resulting gas mixture into the cylinders.

A constant requirement, and even a permanent structural constraint, in the field of automobile manufacturing is to save space in particular under the hood and in the area of the engine.

Description of the Related Art

Within the framework of this general problem, a strong tendency targets the integration of several complementary functions, associated and/or consecutive, in the same module or the same structural unit.

Thus, it has been proposed for several years to combine the "intake distributor" and "heat exchanger" functions in the same module, and various solutions for achieving this type of individual and multifunctional module are already known.

In the state of the art, there are known in particular intake distributors for internal combustion engines that integrate at least one heat exchanger mounted in the inside volume of said collector, i.e., hermetically encapsulated.

The result is that said inside volume is separated into two compartments that are located on both sides of said exchanger and that the stream of gas circulating in the collector passes through said exchanger to pass from a first one of said compartments to the second compartment.

Two major problems are posed in this type of composite structure (combined module: distributor+integrated exchanger), namely the rigid holding of the exchanger in the body of the distributor and the necessity for sealing the peripheral interface between the exchanger and the body of the distributor (interstitial volume), so as to force the gas stream to pass through the exchanger (i.e., to pass through the formation or the bundle of tubes or fins in which the gas stream to be cooled circulates by circulating around and between these tubes or fins) and thus to optimize the action of the latter.

In accordance with a first embodiment that is known from intake collectors that form combined modules, for example illustrated by the documents US 2011/0088663 and WO 2011/061311, the integrated exchanger is produced in situ in cooperation with the body of the collector, with certain parts being used simultaneously in the exchanger and the collector.

In this first type of embodiment, the functional parts of the exchanger are assembled with the walls of the collector by carrying out a double sealing, namely the sealing of the exchanger itself and the sealing of the latter relative to the collector.

The result is a complex structure and very high manufacturing and mounting constraints, resulting in a high cost.

In accordance with a second known embodiment, for example of the document EP-A-2 722 516, the exchanger is provided with a peripheral framework that is sandwiched during the assembly of the two parts of the housing of the distributor. The framework thus ensures the rigid attachment of the exchanger in the housing and a peripheral seal around the exchanger.

Nevertheless, the assembly operation is difficult to carry out, and significant constraints come into play on the assembly level (execution of a mechanical attachment and a double seal in the area of this level).

According to a third known embodiment, the heat exchanger is produced separately and then mounted in the distributor body when the latter is already assembled for the most part (cf. WO 2008/061850, DE 10 2007 030 464, WO 2009/027492 or FR 2 645 209) or by being integrated during assembly of the different parts of the distributor (cf. FR 2 936 572, WO 2011/064087 or FR 2 908 833). In this second type of known embodiment, the holding in position of the exchanger is carried out by locking in the body of the distributor or by securing with the wall of the latter, optionally by means of a plate or a crosspiece, with the sealing of the distributor being managed in an independent manner.

Furthermore, various embodiments of peripheral sealing means around the exchanger are also known (airtight barrier between the outer faces of the exchanger and the inner wall of the housing of the distributor).

Thus, the documents GB 1 540 465 and DE 10 2008 061 759 disclose linear joints with an X-shaped cross-section, a priori integral, connected to the exchanger or between the surfaces to be sealed interstitially. However, the nature of the mounting of the exchanger in the housing is not indicated in these documents, nor is the interaction between the mounting and sealing functions.

Finally, a distributor that integrates an exchanger with a peripheral seal, created by means of a U-shaped joint made of rigid plastic, is known by the document EP 2 715 267. The latter overlaps projecting edges of the exchanger casing, which ensure guiding during the introduction and rigid holding after the exchanger is inserted into the housing (by working with housing grooves formed in the walls of the distributor). The functions of rigid mounting and peripheral sealing are consequently ensured by the same means and in the same regions. In addition, the U-shaped joint has to be threaded onto the exchanger during the assembly of the distributor by a labor-intensive process.

BRIEF SUMMARY OF THE INVENTION

This invention has as its object to propose a structural solution of a distributor integrating an exchanger, in which the mounting and peripheral sealing functions around the exchanger are differentiated structurally and spatially, while providing sealing that adapts to the differentiated dimensional variations of the exchanger and the distributor (different thermal expansion coefficients), quick and easy to mount, optionally able to be made of several materials suited to the installation site and advantageously able to be assembled in a sturdy and precise manner with the exchanger, even before its mounting in the distributor.

In addition, the exchanger that is structurally integrated into the distributor should not be dependent upon a mounting support also forming a closing cover for the housing of the distributor, in such a way as to make possible a more flexible mounting in the latter.

For this purpose, the invention has as its object a distributor or intake collector for an internal combustion engine, in particular a supercharged air intake distributor, comprising a heat exchanger whose body has a general parallelepiped shape, which is mounted in the housing of said distributor and which is designed to be exposed to the gas stream that passes through said housing, With said exchanger comprising or being integral with a plate or a crosspiece for support and attachment, connected to or forming a face of the body of the exchanger and ensuring its rigid mounting in this housing, With said exchanger being positioned in said housing with an interstitial volume being formed between them, essentially overlapping the body of said exchanger, and peripheral sealing means being connected to the body of the exchanger and to the plate or crosspiece for support and attachment in such a way as to form an essentially continuous circumferential airtight barrier between the latter and the housing of the distributor, peripherally dividing the interstitial volume into two, advantageously along a plane that is essentially perpendicular to the direction of circulation of the gas stream that passes through said exchanger, Distributor characterized In that the subdivision plane of the interstitial volume is separate from the main plane of the plate or the crosspiece for support and attachment, and advantageously inclined, and preferably essentially perpendicular in relation to the latter, and In that the peripheral sealing means consist of two complementary components that are connected to one another and made integral with the exchanger, namely a first component in the form of a U-shaped joint that is connected to the three faces of the body of the exchanger that are not associated with the crosspiece or with the support and attachment plate, and a second component in the form of an essentially linear joint that is connected to the face associated with said crosspiece or plate, with said essentially linear joint being assembled mechanically, in the area of its two opposite longitudinal ends, with free ends of two branches of the U-shaped joint.

BRIEF DESCRIPTION OF THE DRAWINGS

The invention will be better understood, owing to the description below, which relates to preferred embodiments, provided by way of non-limiting examples, and explained with reference to the accompanying diagrammatic drawings, in which.

DETAILED DESCRIPTION OF THE PREFERRED EMBODIMENTS

Figure 1:
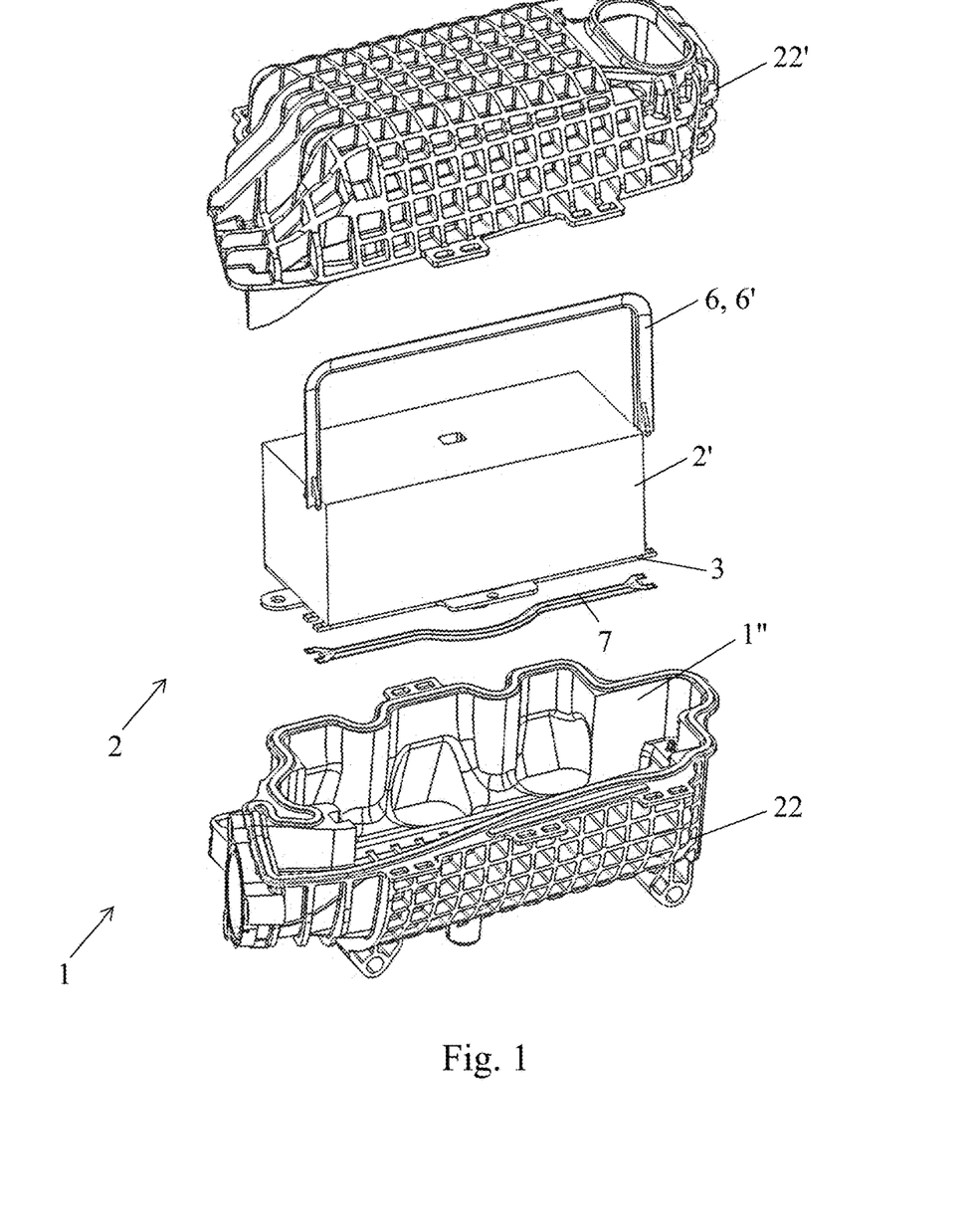
FIG. 1 is an exploded perspective view of an intake distributor that integrates a heat exchanger, for forming a multifunctional module according to a preferred embodiment of the invention.
Figure 2:
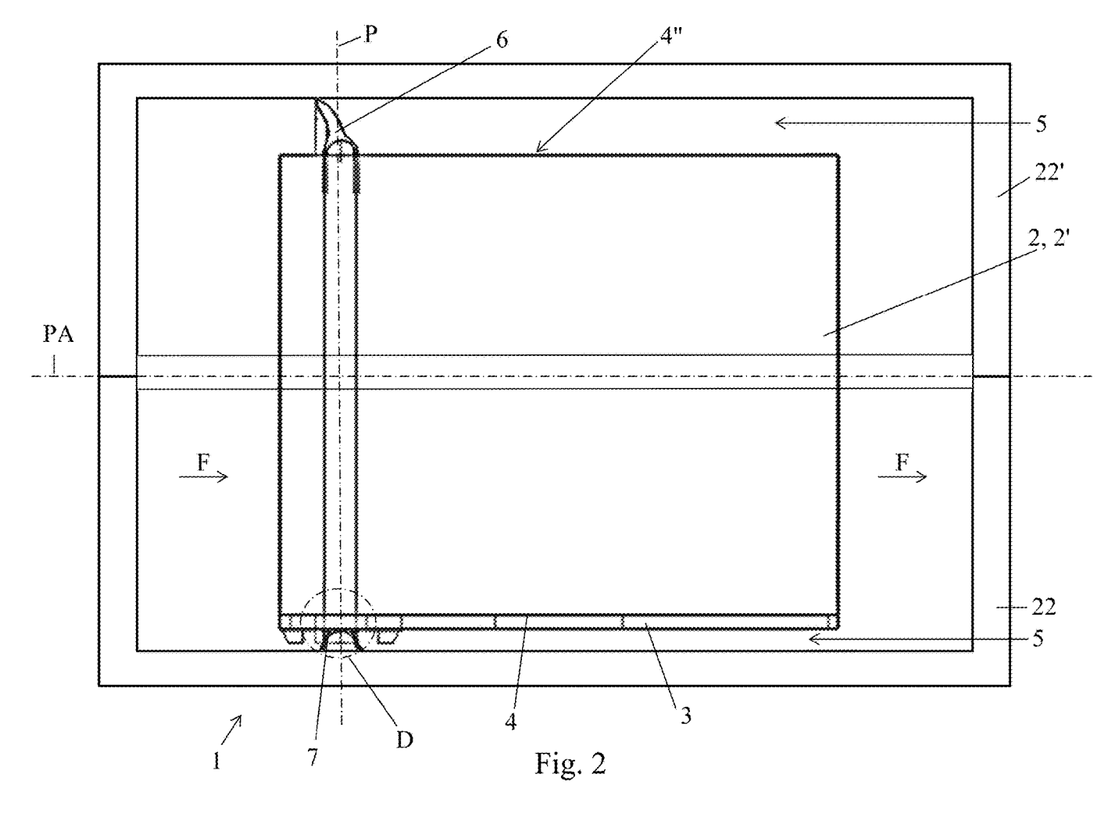
FIG. 2 is a cutaway elevation view, along a plane that is perpendicular to the plane that contains the peripheral sealing means formed by a U-shaped joint and a linear joint, of the distributor of FIG. 1 in the assembled state.

FIGS. 1 and 2, and partially FIGS. 3, 4, 8 and 9, illustrate a distributor or intake collector for an internal combustion engine, comprising a heat exchanger 2 whose body 2' has a general parallelepiped shape, which is mounted in the housing 1' of said distributor 1 and which is designed to be exposed to the gas stream F that passes through said housing 1'.

This exchanger 2 comprises or is integral with a plate or a crosspiece 3 for support and attachment, connected to or forming a face 4 of the body 2' of the exchanger 2 and ensuring its rigid mounting in this housing 1'.

This exchanger 2 is positioned in said housing 1', whereby an interstitial volume 5 is formed between them, which essentially surrounds the body 2' of said exchanger 2, and peripheral sealing means 6, 7 are connected to the body 2' of the exchanger 2 and to the plate or crosspiece for support and attachment 3 in such a way as to form an essentially continuous circumferential airtight barrier between the latter and the housing 1' of the distributor 1, peripherally dividing the interstitial volume 5 into two, advantageously along a plane P that is essentially perpendicular to the direction of circulation of the gas stream F that passes through said exchanger 2.

The housing 1' can, for example, be formed by the assembly of two parts (lower 22 and upper 22') in the form of shells (FIG. 1).

In accordance with the invention, it is provided that the plane P that subdivides the interstitial volume 5 is separate from the main plane of the plate or the crosspiece for support and attachment 3, and is advantageously inclined and preferably essentially perpendicular in relation to the latter.

In addition, the peripheral sealing means consist of two complementary components 6 and 7 that are connected to one another and made integral with the exchanger 2, namely a first component 6 in the form of a U-shaped joint connected to the three faces 4', 4", 4''' of the body 2' of the exchanger 2, not associated with the crosspiece or the plate for support and attachment 3, and a second component 7 in the form of an essentially linear joint that is connected to the face 4 associated with said crosspiece or plate 3, with said essentially linear joint 7 abutting and being assembled mechanically, in the area of its two opposite longitudinal ends 7', 7", with the free ends 9 of the two branches 8, 8' of the U-shaped joint 6.

Owing to these arrangements, the mounting and peripheral sealing functions of the exchanger are clearly differentiated and separated from one another, and sealing is provided in the area of the four faces or peripheral sides of the exchanger 2 located opposite the inner wall 1" of the housing 1' that houses it.

In addition, a composition in two parts of the continuous peripheral sealing 6, 7 allows an easy manufacturing and mounting, while limiting the number of elementary components to assemble and to premount on the exchanger 2 before its installation in said housing 1'.

This structural decomposition of the continuous peripheral seal also makes it possible, taking into account in particular the oriented placement of the exchanger 2 in the distributor 1, with definition of an upper side and a lower side, to use, if necessary, a different joint profile in the area of this lower side, under the plate or support crosspiece 3, more suited to this region.

The profiles of U-shaped joints 6 and linear joints 7 are, of course, suited for ensuring the sealing despite the manufacturing tolerances and the thermal expansions or under pressure of the body 2' of the exchanger 2 and of the housing 1' of the distributor 1.

For the purpose of facilitating their connecting, without using the additional piece or tools or particular technological method, the two joints are preferably assembled together in the area of their two connecting zones, by complementary assembly means 10, 11, working with one another by mechanical engagement with interlocking, clipping, or elastic locking.

Advantageously, in the area of the free ends 9 of the two branches 8, 8' of the U-shaped body 6', the U-shaped joint 6 comprises catches, hooks, spears, or similar prominent hooking formations 10, and at its two opposite ends 7' and 7" of the laterally projecting hooking sites 11, the linear joint 7 comprises in particular handles, eyelets, or similar apertured formations that are able and designed to accommodate the prominent formations 10 of the ends 9 of the U-shaped joint 6 to produce locked mechanical bonds by working together.

So as to allow a simple and reliable premounting of the joints 6 and 7 on the body 2' of the exchanger 2, to regroup geographically the securing sites and to be able to carry out, if necessary simultaneously, the assembly and premounting operations, the two joints 6 and 7 that form the two components of the peephole sealing means are also connected mechanically to the crosspiece or plate for support and attachment 3, preferably in the area of their ends 7', 7", 9 that are assembled together, with the U-shaped joint 6 advantageously being kept under pressure resting against the faces 4', 4", 4'" of the body 2' of the exchanger 2 by means of this bond.

In accordance with a very preferred structural embodiment, as shown in particular in FIGS. 3, 4, 6 and 7, the crosspiece or plate for support and attachment 3 comprises apertured formations 12, projecting laterally and aligned with the apertured formations 11 of the opposite ends 7' and 7" of the linear joint 7, such as handles, eyelets, or the like, with the prominent hooking formations 10 of the ends 9 of the branches 8, 8' of the U-shaped joint 6 engaging by through-holes and with locking by interlocking, clipping or elastic deformation, with the above-mentioned superposed apertured formations 11 and 12, the linear joint 7 thus being pressed against the crosspiece or the plate 3 at least in the area and close to said superposed apertured formations 11 and 12.

Figure 3:
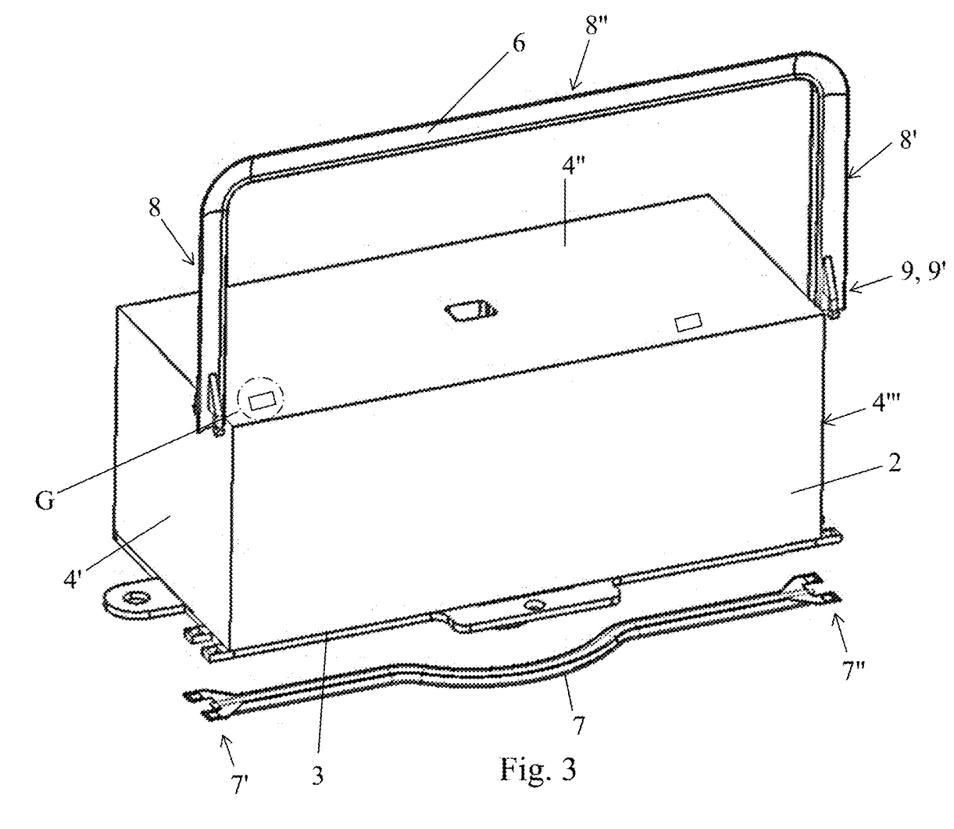
FIG. 3 is a perspective view of a heat exchanger as shown in FIGS. 1 and 2, before mounting of the peripheral sealing means.
Figure 12:
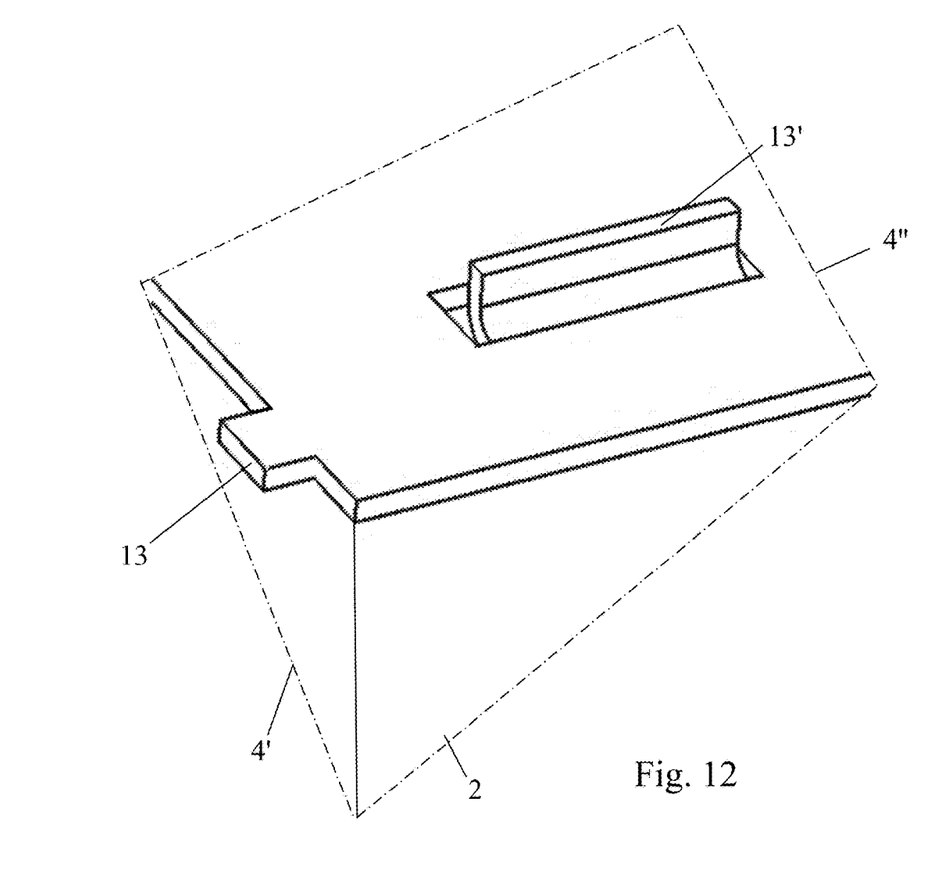

For the purpose of securing the seal 6, 7 on the body 2' and preventing its movement, said body 2' can be provided, as FIGS. 3 and 12 show by way of example, on at least one of its outer faces in question 4', 4", 4'", of means 13, 13' for wedging and/or holding the U-shaped joint 6, such as, for example, tabs or the like.

These wedging means can, for example, consist of wings, lips or projecting tabs 13, 13' in the form of extensions or recesses of said body 2' or of its outer casing.

Figure 5:
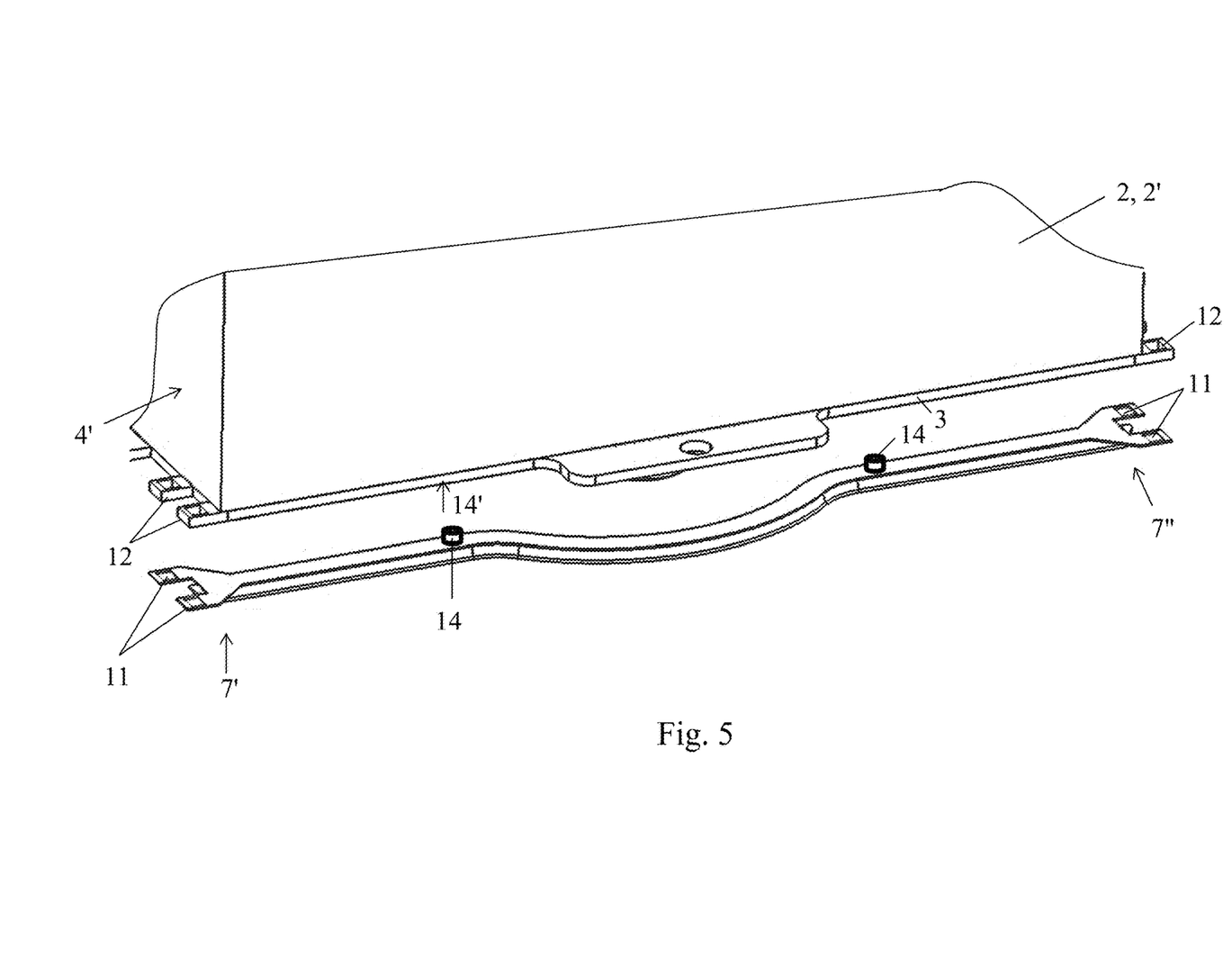
FIG. 5 is a partial view of the lower part of the object shown in FIG. 3.
Figure 8:
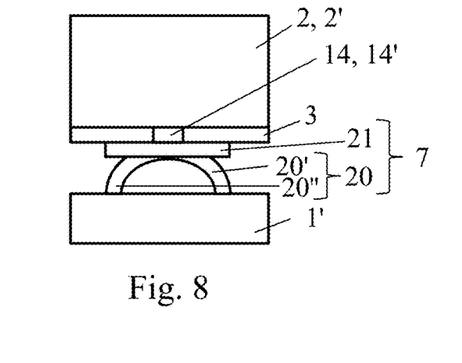
FIG. 8 is a partial view of the detail D of the object of FIG. 2.
Figure 9A:
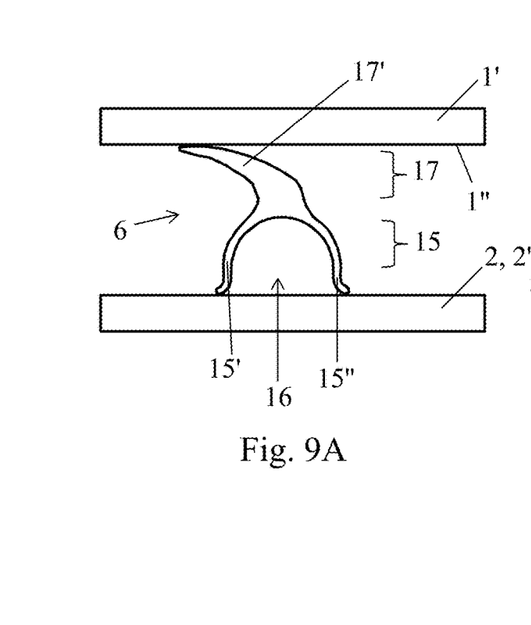
FIGS. 9A to 9C are views that are similar to those of FIG. 8, illustrating the implementation of structural variants of the peripheral joint.
Figure 9B:
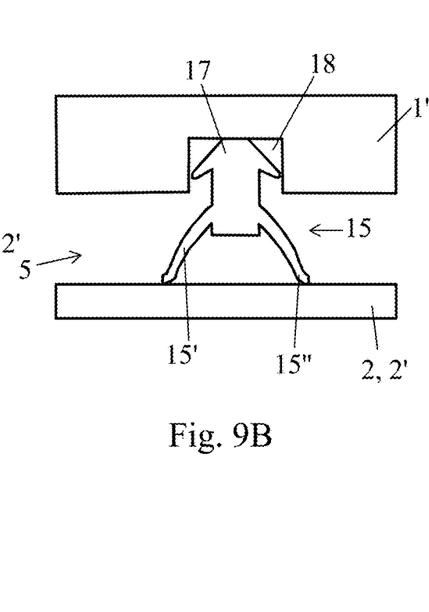
Figure 9C:
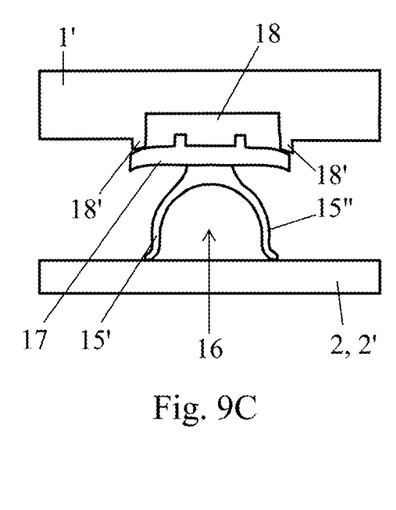
Figure 10:
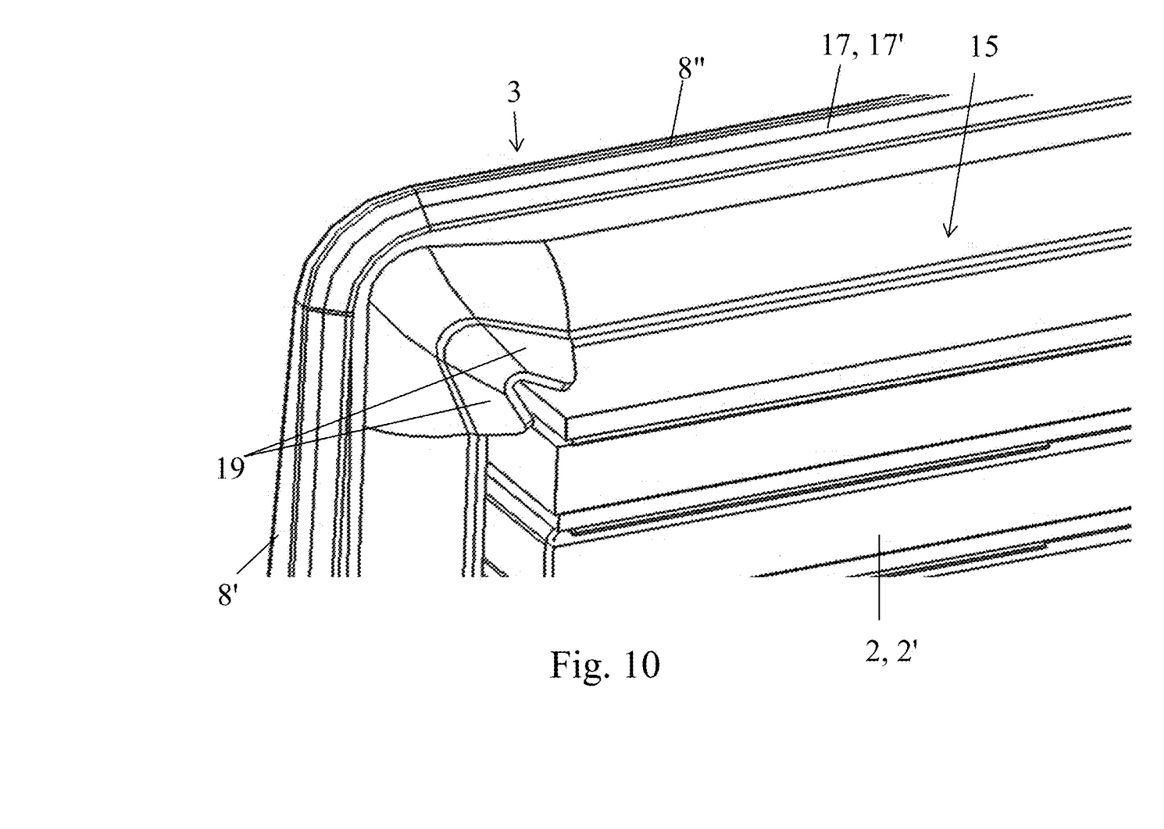
FIG. 10 is a view of the detail E of FIG. 4A, on a different scale.
Figure 11:
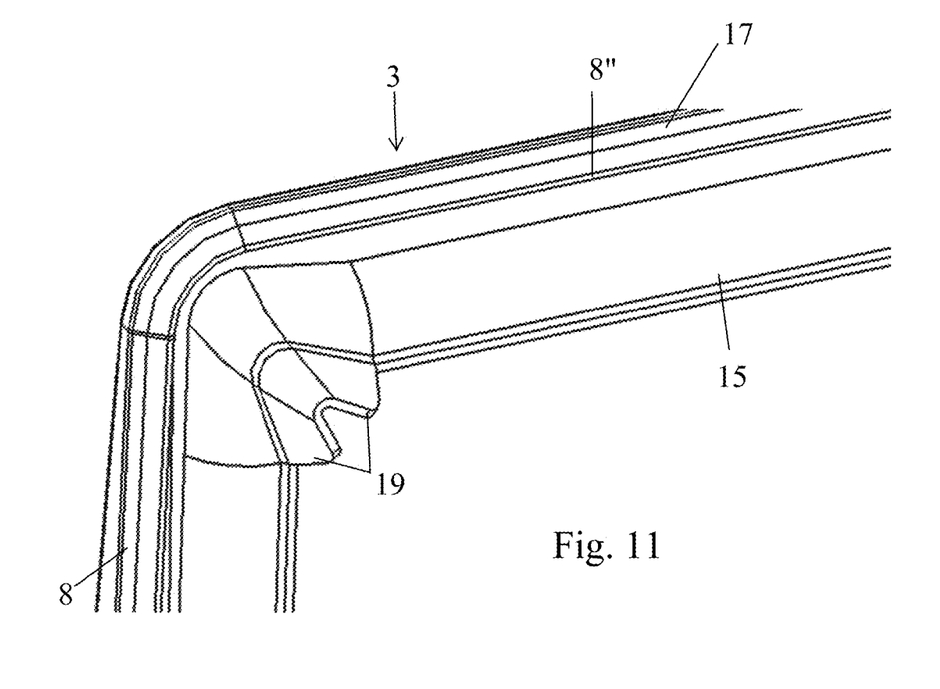
FIG. 11 is a view that is similar to that of FIG. 10 of the joint by itself, and, FIG. 12 is a view of the detail G of FIG. 3, on a different scale.

In a similar manner, it may be provided that the crosspiece or the plate for support and attachment 3, on the one hand, and the linear joint 7, on the other hand, are provided with indexing means 14, 14' that work together and optionally securing means, such as, for example, pairs [lug 14/blind hole 14'] (see FIGS. 5 and 8).

Figure 4A:
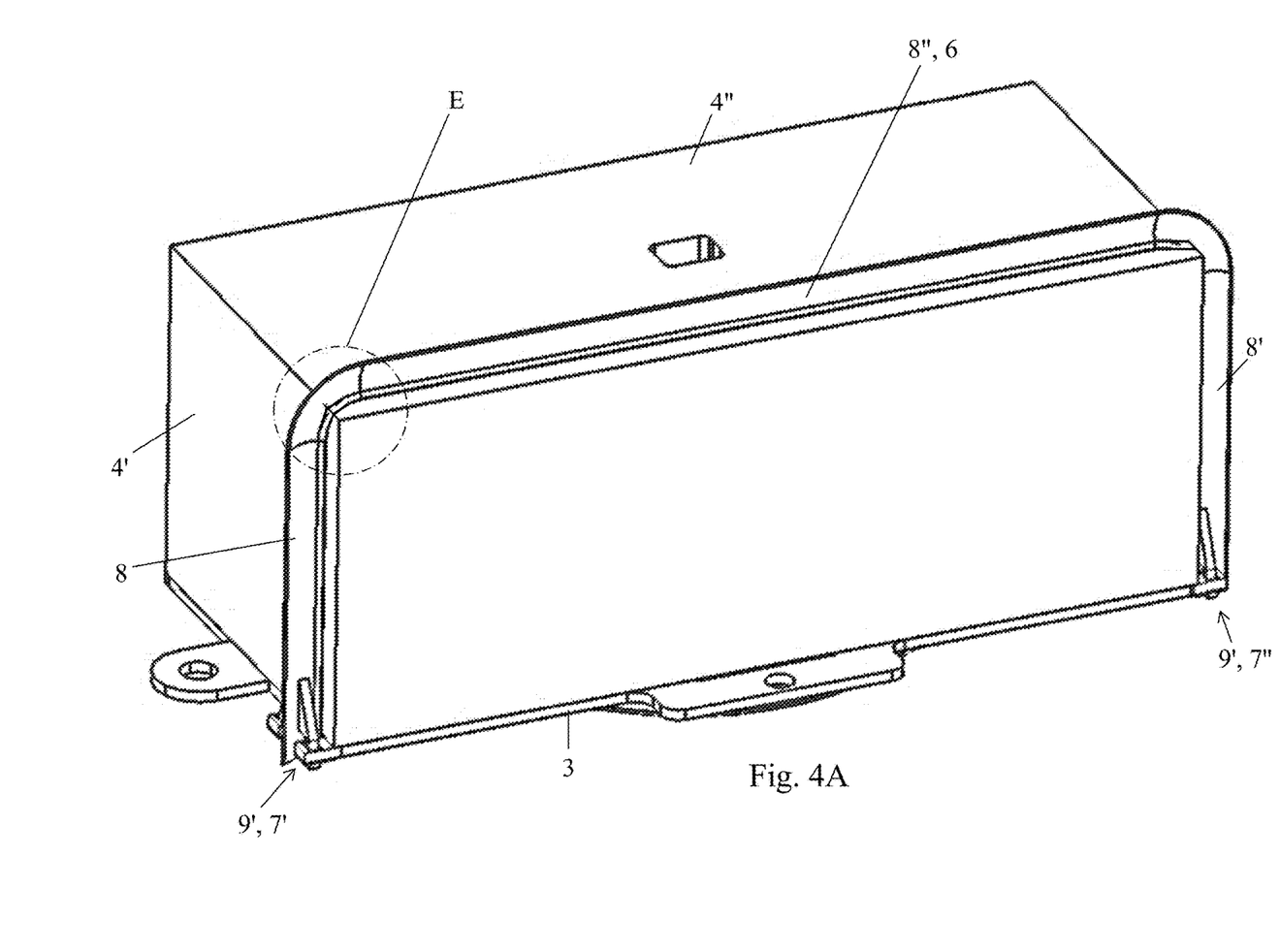
FIGS. 4A and 4B are perspective views of the exchanger of FIG. 3, with the peripheral sealing means being in place.
Figure 4B:
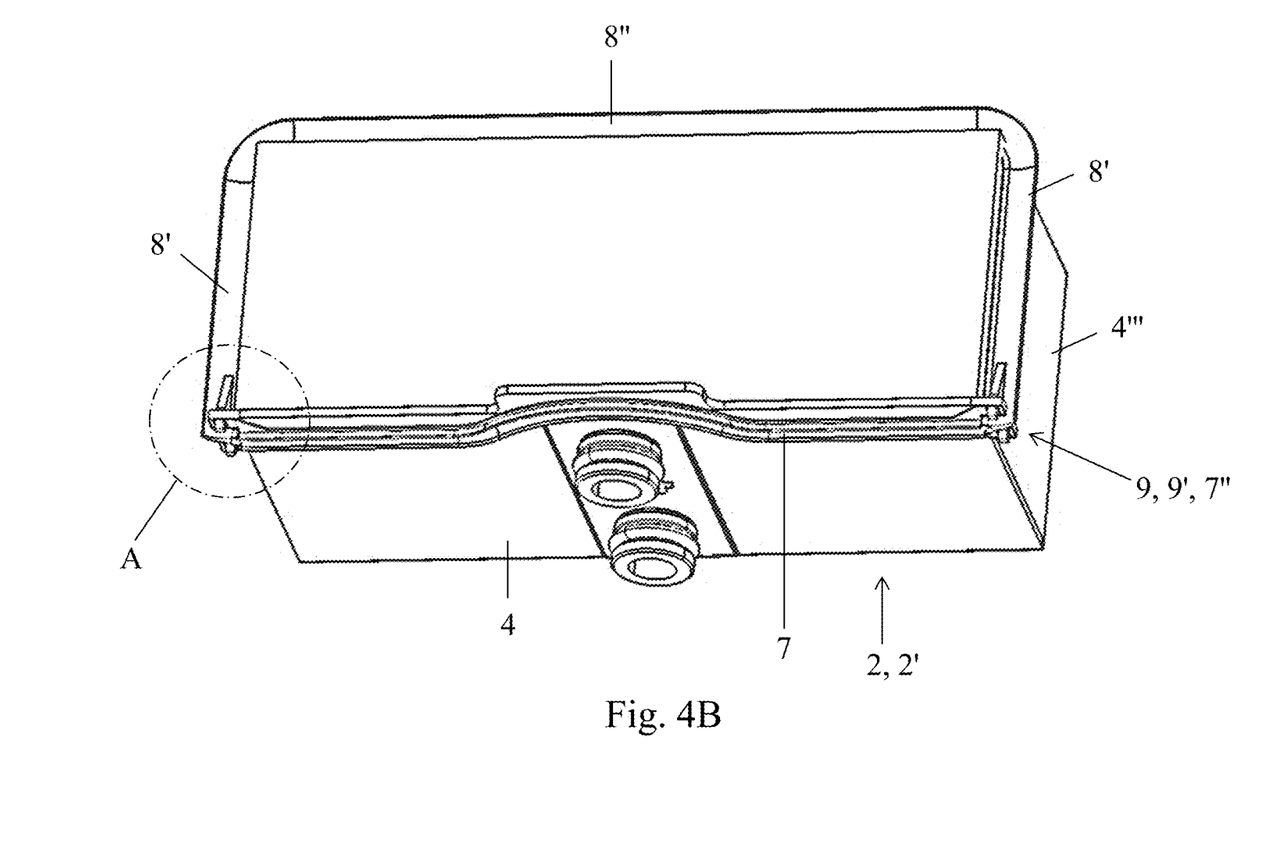
Figure 6:
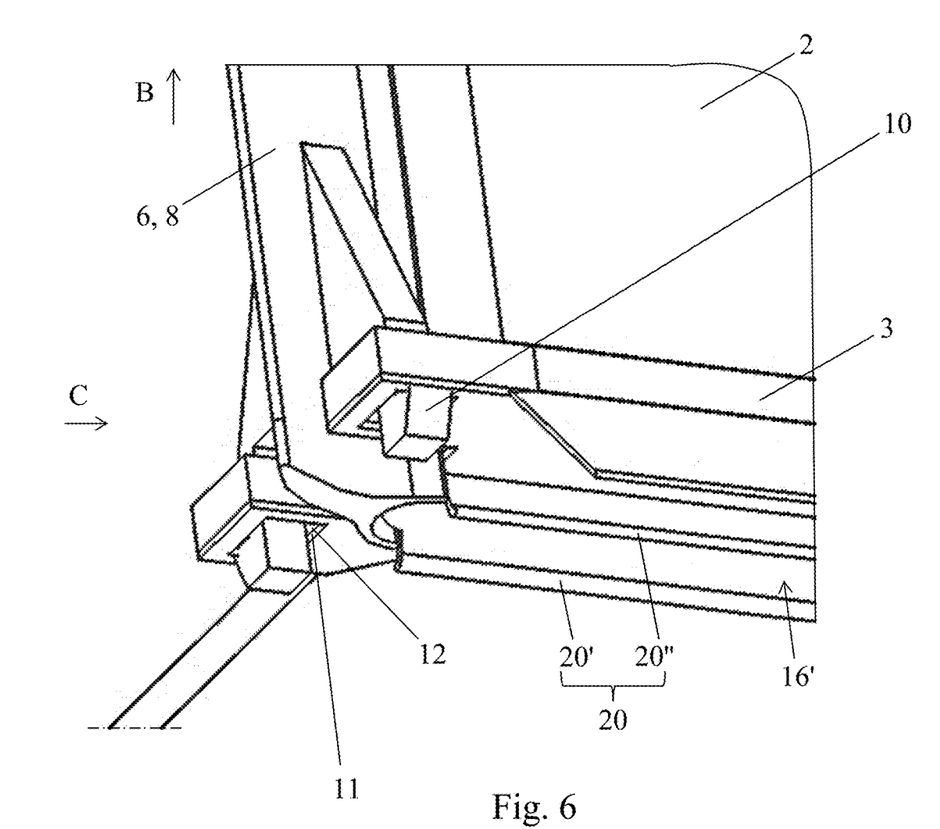
FIG. 6 is a view of the detail A of FIG. 4B, on a different scale.
Figures 7A, 7B:
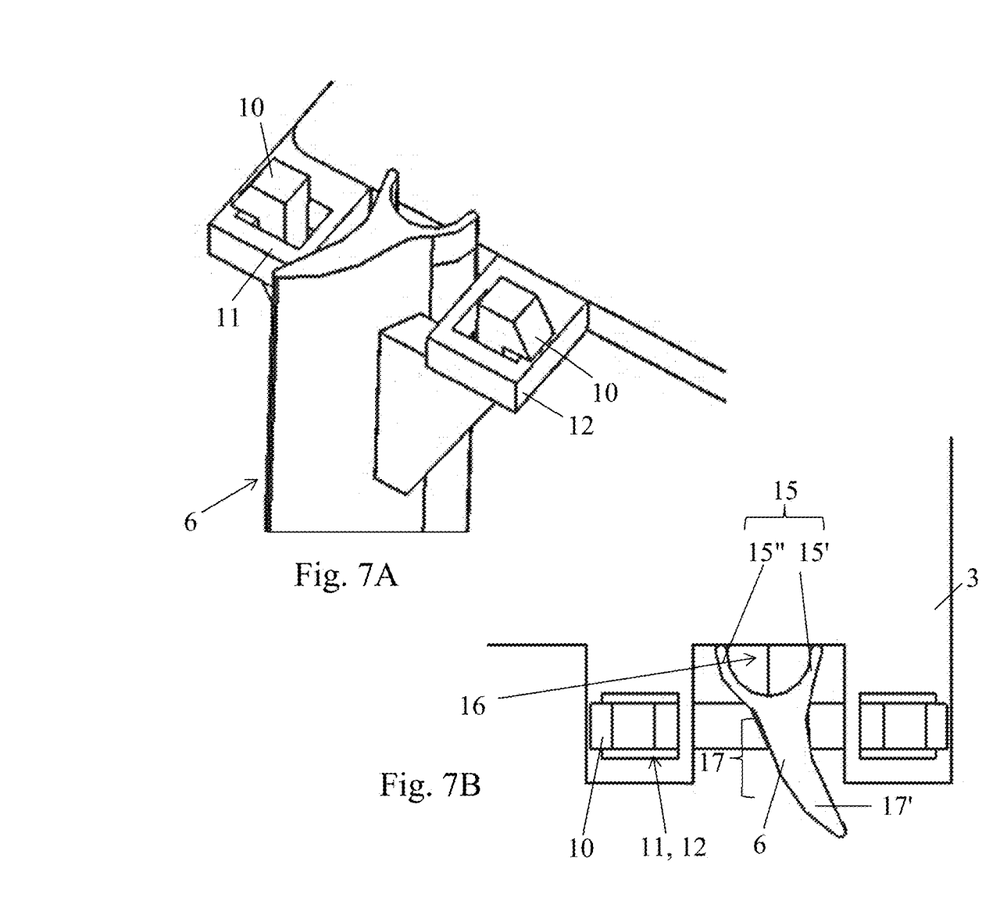
FIG. 7A is a partial bottom perspective view of the object of FIG. 6, with the lower linear joint not being shown.
FIG. 7B is a partial bottom view, in the direction B of the object of FIG. 6.
Figure 7C:
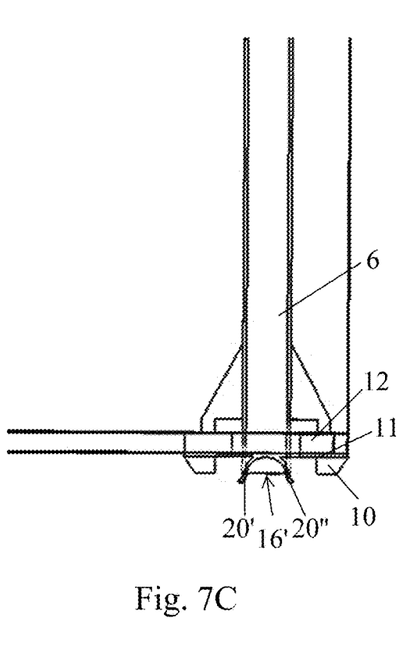
FIG. 7C is a partial side view, in the direction C of the object of FIG. 6, with the lower part of the U-shaped joint being removed.

So as to ensure a continuity of sealing in the area of the zones of corners or smaller angles of the body 2' of the exchanger 2, the terminal edges 9' of the free ends 9 of the branches 8, 8' of the U-shaped joint 6 are located beyond the face 4 of the plate or crosspiece for support and attachment 3 that supports the linear joint 7 and are connected by abutting with the opposite ends 7', 7" of said linear joint 7 (see FIGS. 4B, 6 and 7).

Preferably, and as FIGS. 6, 7, 9A, 9B and 9C illustrate by way of structural variants, each of the three constituent segments 8, 8', 8'" of the U-shaped joint 6 consists of, viewed in a transverse cutaway, on the one hand, a first part 15 that rests under pressure on the corresponding face 4', 4", 4'" opposite the body 2' of the exchanger 2 and comprising two mutually divergent longitudinal wings 15' and 15", preferably arched or curved in cross-sections and forming with said faces 4', 4", 4'" parts of channels 16, and, on the other hand, a second part 17 that rests on the inner wall 1" of the housing 1' of the exchanger 1 and comprises a longitudinal flexible formation of contact 17' working in an airtight manner with a flat surface portion, a groove 18 or ribs 18' of said inner wall 1".

To ensure the sealing in the area of the angular regions that connect the lateral faces 4' and 4'" to the upper face 4" of the exchanger 2 and to adapt to the structural dispersiveness of the latter, it can be provided that the U-shaped joint 6 comprises, in the area of the two corners that connect two by two the three constituent segments 8, 8', 8" of its body 2', projecting and flexible lateral lips 19, in the form of angle bars, which rest tightly on the respectively corresponding corner of the body 2' of the exchanger 2.

Advantageously, the second part 17 of the joint 6 has a cross-section that is similar to the first part of 20 of the joint 7.

At the very least, it can be provided that the free ends 9 of the branches 8 and 8' of the body 6' of the U-shaped joint 6 essentially seal the opposite openings of the part of the channel 16' that is formed by the cooperation of the linear joint 7 with the inner wall 1" of the housing 1' of the distributor 1, with the terminal edges 9' of said free ends 9 resting on said inner wall 1".

Advantageously, the body of the linear joint 7 consists, on the one hand, of a first part 20 that rests under pressure on the inner wall 1" of the body 1' of the housing 1 and that comprises two mutually divergent longitudinal wings 20' and 20", preferably arched or curved in the cross-section and that form with said inner wall 1" a part of channel 16', and, on the other hand, a second flat part 21 in surface contact with the crosspiece or the plate for support and attachment 3.

Taking into account their positioning of their separate roles, the body 6' of the U-shaped joint 6 is made of a material, for example a thermoplastic elastomer, that is more flexible than the constituent material of the linear joint 7, for example uncharged polyamide 66.

In accordance with a preferred practical structure, shown in FIGS. 1 and 2, the housing 1' consists of two complementary constituent parts 22 and 22', namely an upper part 22 and a lower part 22' assembled in the area of working respective edges, defining an inclined assembly plane AP in relation to the subdivision plane P, preferably perpendicular to the latter, with the lower part of the housing 22' comprising attachment sites for the plate or the crosspiece for support and attachment 3.

Advantageously, the housing 1' is made of plastic material, preferably by airtight assembly of two parts 22 and 22' in the form of half-shells made of thermoplastic material.

The invention also relates to a motor vehicle with an internal combustion engine, supercharged or not, comprising a circuit for recirculation of the EGR gases or not and comprising an air intake system with a distributor or intake collector for supercharged air. This vehicle is characterized in that the distributor is a distributor 1 as described above, creating a multifunctional module that integrates at least one heat exchanger 2 in the chamber of its housing 1' in the tubes, fins or the like of the body 2' from which the supercharged air circulates.

Finally, the invention also relates to a method for manufacturing a distributor as described above.

This method consists in providing the two constituent parts 22 and 22' of a housing 1' of the distributor 1, a heat exchanger 2 that is provided with a plate 3 for support and attachment, a U-shaped joint 6 and a linear joint 7, to mount the two joints 6 and 7 on the body 2' of the exchanger 2, locking the mounting of them by interlocking or clipping and in such a way as to create a peripheral sealing fixture around said body 2', to place the thus equipped exchanger 2 in the lower part 22' of the housing 1' of the distributor 1 and to make said plate 3 integral with attachment sites of this lower part 22', and, finally, to assemble in an airtight manner the upper part 22 with the lower part 22', for example by welding by laser or by hot gas, by bonding or by mechanical securing, to create the housing 1' of the distributor 1.

Of course, the invention is not limited to the embodiments described and shown in the accompanying drawings. Modifications are possible, in particular from the standpoint of the composition of the various elements or by substitution of equivalent techniques, without thereby exceeding the field of protection of the invention.

The invention claimed is:

1. A distributor or intake collector for an internal combustion engine, including a supercharged air intake distributor, comprising:
   a housing (1');
   a heat exchanger (2) with a body (2') having a parallelepiped shape,
   the body (2') being mounted in the housing (1') and being designed to be exposed to a gas stream (F) that passes through said housing (1'),
   said heat exchanger (2) comprising a plate or a crosspiece for support and attachment (3) forming a face (4) of the body (2') of the heat exchanger (2) and ensuring rigid mounting of the body (2') of the heat exchanger (2) in the housing (1'), the plate or crosspiece (3) for support and attachment (3) extending along a main plane;
   a peripheral seal (6, 7) attached to the heat exchanger (2) and extending entirely around the heat exchanger (2), the peripheral seal (6, 7) comprising two complementary components (6, 7) that are mechanically connected to one another,
   said heat exchanger (2) being positioned in said housing (1') with an interstitial volume (5) being formed between said heat exchanger (2) and said housing (1'), essentially overlapping the body (2') of said heat exchanger (2),
   the peripheral seal (6, 7) being connected to the body (2') of the heat exchanger (2) and to the plate or the crosspiece for support and attachment (3) in such a way as to extend entirely around the heat exchanger (2) and form a continuous circumferential airtight barrier between the i) body (2') of the heat exchanger (2) and the plate or crosspiece for support and attachment (3) and ii) the housing (1') of the distributor (1), peripherally dividing the interstitial volume (5) into two, along a subdivision plane (P) that is essentially perpendicular to the direction of circulation of the gas stream (F) that passes through said heat exchanger (2),
   wherein the subdivision plane (P) of the interstitial volume (5) is separate from the main plane of the plate or the crosspiece for support and attachment (3), and
   wherein the two complementary components (6, 7) that are mechanically connected to one another are integral with the heat exchanger (2), the two complementary components (6, 7) being i) a first component (6) in the form of a U-shaped joint that is connected to three faces (4', 4", 4''') of the body (2') of the heat exchanger (2) that are not associated with the crosspiece or the plate for support and attachment (3), and ii) a second component (7) in the form of an essentially linear joint that is connected to the face (4) of the body (2') of the heat exchanger (2) formed by the plate or the crosspiece for support and attachment (3), wherein the U-shaped joint (6) and the essentially linear joint (7) are connected to the body (2') of the heat exchanger (2),
   said essentially linear joint (7) having two opposite longitudinal ends (7', 7"), said essentially linear joint (7) abutting and being assembled mechanically, in an area of the two opposite longitudinal ends (7', 7"), with respective free ends (9) of two branches (8, 8') of a body (6') of the U-shaped joint (6).

2. The distributor according to claim 1, wherein the U-shaped joint (6) and the essentially linear joint (7) are assembled together by complementary assembly means (10, 11), working with one another by mechanical engagement with interlocking, clipping or elastic locking.

3. The distributor according to claim 2, wherein the U-shaped joint (6) comprises, in an area of the free ends (9) of the two branches (8, 8') of the U-shaped body (6') prominent hooking formations (10), and wherein the two opposite longitudinal ends (7', 7") include laterally projecting hooking sites (11) formed as handles with apertured formations (11) that are able and designed to accommodate the prominent formations (10) of the free ends (9) of the U-shaped joint (6) to produce locked mechanical bonds by working together.

4. The distributor according to claim 3, wherein the U-shaped joint (6) and the essentially linear joint (7) that form the two components of the peripheral seal are connected mechanically to the crosspiece or the plate for support and attachment (3), with the U-shaped joint (6)

being kept under pressure resting against the faces (4', 4", 4''') of the body (2') of the heat exchanger (2).

5. The distributor according to claim 4, wherein the crosspiece or the plate for support and attachment (3) comprises apertured formations (12), projecting laterally and aligned with the apertured formations (11) of the opposite longitudinal ends (7', 7") of the essentially linear joint (7), with the prominent hooking formations (10) of the free ends (9) of the two branches (8, 8') of the U-shaped joint (6) engaging by through-holes and with locking by interlocking, clipping or elastic deformation, with the superposed apertured formations (11, 12), the essentially linear joint (7) thus being pressed against the crosspiece or the plate for support and attachment (3) at least in the area and close to said superposed apertured formations (11, 12).

6. The distributor according to claim 1, wherein the body (2') of the heat exchanger (2) is provided, on at least one of its outer faces in question (4', 4", 4'''), with means (13, 13') for wedging and/or holding the U-shaped joint (6).

7. The distributor according to claim 1, wherein the crosspiece or the plate for support and attachment (3) and the essentially linear joint (7) are provided with indexing means (14, 14') that work together.

8. The distributor according to claim 1, wherein terminal edges (9') of the free ends (9) of the two branches (8, 8') of the U-shaped joint (6) are located beyond the face (4) of the plate or the crosspiece for support and attachment (3) supporting the essentially linear joint (7) and connect by abutting with the opposite longitudinal ends (7', 7") of said essentially linear joint (7).

9. The distributor according to claim 1, wherein the U-shaped joint (6) includes three constituent segments (8, 8', 8'''), two of the three constituent segments being the two branches (8, 8'), each of the three constituent segments (8, 8', 8''') of the U-shaped joint (6) comprising, viewed in a transverse cutaway a first part (15) that rests under pressure on the corresponding face (4', 4", 4''') opposite the body (2') of the heat exchanger (2) and that comprises two mutually divergent longitudinal wings (15' and 15"), a second part (17) that rests on an inner wall (1") of the housing (1') and comprises a longitudinal flexible formation of contact (17') working in an airtight manner with a flat surface portion, a groove (18) or ribs (18') of said inner wall (1").

10. The distributor according to claim 1, wherein,
the U-shaped joint (6) includes three constituent segments (8, 8', 8'''), two of the three constituent segments being the two branches (8, 8'),
the U-shaped joint (6) comprises, in an area of the two corners that connect two by two the three constituent segments (8, 8', 8") of the body (2') of the exchanger (2), projecting and flexible lateral lips (19), in the form of angle bars, resting tightly on the respectively corresponding corner of the body (2') of the heat exchanger (2).

11. The distributor according to claim 8, wherein a body of the essentially linear joint (7) comprises a first part (20) that rests under pressure on the inner wall (1") of the body (1') of the housing (1) and that comprises two mutually divergent longitudinal wings (20', 20"), a second flat part (21) in surface contact with the crosspiece or the plate for support and attachment (3).

12. The distributor according to claim 11, wherein,
the two mutually divergent longitudinal wings (20', 20") are arched or curved in cross-section and form, with said inner wall (1"), a part of a channel (16'), the free ends (9) of the two branches (8, 8') of the body (6') of the U-shaped joint (6) essentially seal opposite openings of the part of the channel (16') that is formed by the essentially linear joint (7) working with the inner wall (1") of the housing (1') of the distributor (1), with the terminal edges (9') of said free ends (9) resting on said inner wall (1").

13. The distributor according to claim 1, wherein the body (6') of the U-shaped joint (6) is made of a material that is more flexible than the constituent material of the essentially linear joint (7).

14. The distributor according to claim 1, wherein the housing (1') comprising two complementary constituent parts (22, 22'), namely an upper part (22) and a lower part (22') assembled in the area of respective working edges, defining an assembly plane (AP) that is inclined in relation to the subdivision plane (P), with the lower part of the housing (22') comprising attachment sites for the plate or the crosspiece for support and attachment (3).

15. The distributor according to claim 1, wherein the housing (1') is made of plastic material, by airtight assembly of two complementary parts (22, 22') in the form of half-shells made of thermoplastic material.

16. A motor vehicle with an internal combustion engine, supercharged, comprising or not a circuit for recirculation of EGR gases and comprising an air intake system with a distributor or a collector for supercharged air intake, vehicle wherein the distributor is the distributor (1) according to claim 1, creating a multifunctional module integrating in the chamber of the housing (1') at least one heat exchanger (2) in the tubes or fins of the body (2') from which the supercharged air circulates.

17. A method for manufacturing a distributor according to claim 1, comprising providing two complementary constituent upper and lower parts (22, 22') of the housing (1') of the distributor (1), the heat exchanger (2) that is provided with the plate or the crosspiece for support and attachment, the U-shaped joint (6) and the essentially linear joint (7), to mount the U-shaped joint (6) and the essentially linear joint (7) on the body (2') of the heat exchanger (2), locking the mounting of them by interlocking or clipping and in such a way as to create a peripheral sealing fixture around said body (2'), to place the thus equipped heat exchanger (2) in the lower part (22') of the housing (1') of the distributor (1) and to make said plate or the crosspiece for support and attachment (3) integral with attachment sites of the lower part (22'), and, finally, to assemble in an airtight manner the upper part (22) with the lower part (22'), by bonding or by mechanical securing, to create the housing (1') of the distributor (1).

18. The distributor or intake collector of claim 1, wherein the subdivision plane (P) of the interstitial volume is inclined in relation to the main plane of the plate or the crosspiece for support and attachment (3).

19. The distributor or intake collector of claim 18, wherein the subdivision plane (P) of the interstitial volume is perpendicular in relation to the main plane of the plate or the crosspiece for support and attachment (3).

20. The distributor of claim 4, wherein the U-shaped joint (6) and the essentially linear joint (7) are connected mechanically to the crosspiece or the plate for support and attachment (3) in the area of the two opposite longitudinal ends (7', 7") being mechanically assembled with the respective free ends (9) of two branches (8, 8') of the body (6') of the U-shaped joint (6).

* * * * *